United States Patent
Johannsen

(10) Patent No.: US 12,430,470 B2
(45) Date of Patent: *Sep. 30, 2025

(54) METHODS FOR DETECTING TRACKING ELEMENTS OF A WEB PAGE AND RELATED SERVER DEVICES

(71) Applicant: Usercentrics A/S, Copenhagen (DK)

(72) Inventor: Daniel Johannsen, Haarby (DK)

(73) Assignee: Usercentrics A/S, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,690

(22) Filed: Feb. 6, 2024

(65) Prior Publication Data

US 2024/0179219 A1     May 30, 2024

Related U.S. Application Data

(63) Continuation of application No. 17/614,342, filed on Nov. 25, 2021, now Pat. No. 11,928,244.

(51) Int. Cl.
| | |
|---|---|
| *H04L 67/56* | (2022.01) |
| *G06F 21/57* | (2013.01) |
| *G06F 21/62* | (2013.01) |
| *H04L 67/02* | (2022.01) |
| *H04L 67/50* | (2022.01) |

(52) U.S. Cl.
CPC ........ *G06F 21/6263* (2013.01); *G06F 21/577* (2013.01); *H04L 67/02* (2013.01); *H04L 67/535* (2022.05); *H04L 67/56* (2022.05); *G06F 2221/033* (2013.01); *G06F 2221/2119* (2013.01)

(58) Field of Classification Search
None
See application file for complete search history.

(56) References Cited

U.S. PATENT DOCUMENTS

2011/0185016 A1*   7/2011   Kandasamy .......... G06Q 10/06
                                                       709/203

OTHER PUBLICATIONS

Bujlow Tomasz et al. "Web Tracking: Mechanisms, Implications and Defenses", Proceedings of the IEEE, vol. 105. No. 8, Aug. 1, 2017, pp. 1476-1510.

* cited by examiner

*Primary Examiner* — Cai Y Chen

(57) ABSTRACT

A method is disclosed, performed at a server device, for detecting tracking elements of a web page, wherein the server device is configured to control a proxy server. The method comprises obtaining a web page address configured to connect to a web server. The method comprises establishing a controlled communication interface between the server device and the web server via the proxy server. The method comprises transmitting, via the controlled communication interface, a web page request based on the web page address. The method comprises receiving, via the controlled communication interface, a web page response. The method comprises identifying, based on the web page response, a set of tracking tags including a first tracking tag and a second tracking tag and deactivating all tracking tags of the set; and activating the first tracking tag.

16 Claims, 4 Drawing Sheets

METHODS FOR DETECTING TRACKING ELEMENTS OF A WEB PAGE AND RELATED SERVER DEVICES

CROSS-REFERENCE TO RELATED APPLICATIONS

This is a continuation of U.S. patent application Ser. No. 17/614,342, filed on Nov. 25, 2021, the entire contents of which are incorporated herein by reference.

TECHNICAL FIELD

The present disclosure pertains to the field of communications technology and more specifically to security and privacy in Internet-based communications. The present disclosure relates to methods for detecting tracking elements of a web page and related server devices.

BACKGROUND

When a web browser running on a user device (e.g. a laptop, a smartphone, a tablet) loads a web page, the user device sends a network request to a domain on a webserver and the webserver returns a HTML response which is then rendered in the web browser. The returned HTML response contains different elements which may load external content from other domains on other webserver's domain. The returned HTML response from the webserver can typically manipulate the content and functionality that is rendered on the browser, e.g. by displaying a video, an advertisement and/or by placing cookies and other tracking technologies.

Tracking technologies have evolved and may involve techniques collecting information without consent from user, without informing the user at all and/or without any tools for the user to obtain information about what is tracked. This may result in violating or contravening the privacy of the user.

SUMMARY

Therefore, it would be advantageous to identify the privacy violating elements of a web page in any case. Indeed, today, it is not always visible or transparent to the end user which elements of the web page (e.g. which tag) is tracking or monitoring or performing what activity. Further, it is not possible on the web browser alone to determine how each element or tag manipulates the content and/or the stored data on the web browser, as all content is injected into the same document object model (DOM) asynchronously. The asynchronous injection of content into the same DOM supports achieving fast loading of the webpage. However, the asynchronous injection of content into the same DOM makes it impossible to measure the activity of the tracking techniques live on the web browser.

Further, as external tags are typically operated by 3rd party companies, there is no immediate way to document the tracking activity of these external tags on the webpage, which can be a risk in many cases, and lead to privacy violation. For example, even if a 3rd party is known to the website owner, there may be situations where a declared 3rd party gives access and/or provides opportunity for other parties that may not be known to the website owner to perform tracking activities. Such a chain of 3rd parties is impossible to document today.

Accordingly, there is a need for server devices and methods for detecting tracking elements of a web page, which mitigate, alleviate or address the shortcomings existing and provides an advanced detection and identification of tracking technologies embedded in a web page.

A method is disclosed, performed at a server device, for detecting tracking elements of a web page, wherein the server device is configured to control a proxy server. The method comprises obtaining a web page address configured to connect to a web server. The method comprises establishing a controlled communication interface between the server device and the web server via the proxy server. The method comprises transmitting, via the controlled communication interface, a web page request based on the web page address. The method comprises receiving, via the controlled communication interface, a web page response. The method comprises identifying, based on the web page response, a set of tracking tags including a first tracking tag and a second tracking tag and deactivating all tracking tags of the set; and activating the first tracking tag.

Further, a server device is provided. The server device comprises a memory module, a processor module and an interface module. The server device is configured to perform any of the methods disclosed herein.

It is an advantage of the present disclosure that it enables to detect, identify, and report exactly how each tracking tag is manipulating the content on the web browser, specifically which tracking technologies and tracking elements each tracking tag is deploying to the browser when visiting any specific web page address, or Uniform Resource Locator (URL). This extends to tracking technologies and elements not visible to the user (e.g. via a third party known the website owner but further providing access to an additional party unknown to the website owner). It is an advantage of the present disclosure to uncover the entity (e.g. third party) deploying the tracking tag and provide such information to the user to increase transparency in privacy techniques and enable the user to provide appropriate consent or refusal via privacy-complying techniques.

Further, an electronic device is provided. The electronic device comprises a memory module, a processor module and an interface module. The electronic device is configured to transmit a web page address to a server device and to receive a report comprising one or more tracking attributes associated with a set of tracking elements of the web page.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
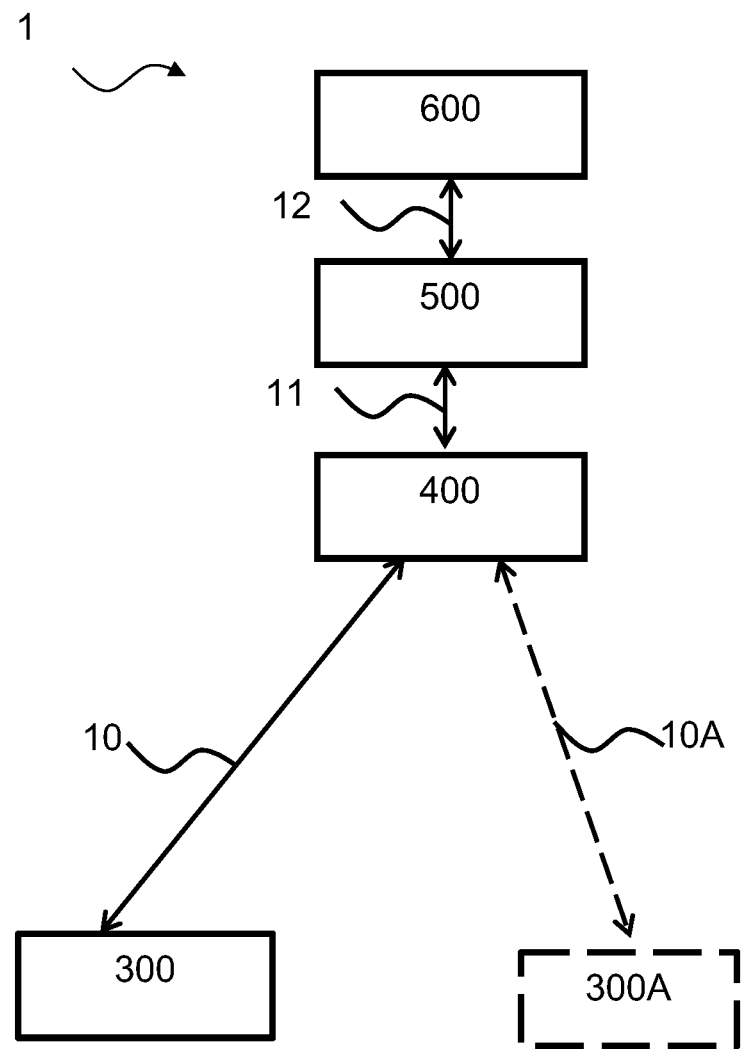
FIG. 1 is a diagram illustrating an exemplary communication system comprising an exemplary server device and an exemplary user device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Privacy may be seen as the right of individuals or users to determine when, how, and to what extent information related to themselves is monitored and/or reported to others. To this end, the present disclosure may be seen as providing a privacy-enhancing technique.

One tracking technique to collect user information involves cookies, e.g., HTTP cookies (HyperText Transport Protocol). Cookies can be used to collect information about a user's action within a web site or for other purposes. This information is often collected and used without the knowledge or consent of the user of the web site.

Many governmental entities have considered regulating the use of cookies. For example, an e-commerce site might be forbidden to send cookies to a user unless there is full disclosure to the user about the purpose of each cookie. In that case, the e-commerce site would need to drastically reduce or completely eliminate their use of cookies.

However, external tags may be operated by 3rd party companies and there is no immediate way to document the tracking activity of these external tags on the webpage, which can be a risk in many cases, and lead to privacy violation. For example, even if a 3rd party is known to the website owner, there may be situations where a declared 3rd party gives access and/or provides opportunity for other parties that may not be known to the website owner to perform tracking activities. Such a chain of 3rd parties is impossible to document today.

An HTML logical structure builds a DOM and there may be multiple authors on the DOM, which are identified using the disclosed technique.

Therefore, the present disclosure provides methods and server devices that provides control and monitoring over tracking elements even the tracking elements not directly visible to the user. By monitoring the network traffic between the server device and the web server through a controlled proxy server and in an synchronous context where only one embedded element is loaded at a time, any content loaded and any manipulation of the DOM, e.g. insertion of tracking elements, can be detected and assigned to the specific tag or tracking element that is currently in a loading state at the time when the manipulation is executed on the server device. Tracking technologies may span different methods to identify the user. For example, tracking technologies can deploy a unique pattern to a tracking element which makes it possible for the third party to identify the user, e.g. by storing a global unique user identifier (GUID) in a cookie.

For example, the disclosed methods and server devices permit, by intercepting and analyzing the http network traffic, to identify, using the proxy server, e.g. trackers by the http response header command "SET-COOKIE". These types of server-side cookies are not visible to the end user if the content type of the requested resource is different from 'text/html'. Also the present disclosure allow analyzing network calls for image elements where the response is either very small or empty and includes at least a GUID in the URL for the image from third party domains—these are so called Pixel-Trackers, not visible to the end user. By analyzing any following change in content state, the server device disclosed determines new data stored on the device by the tracking element, e.g. in Local Storage, IndexDB and other standard methods available to persist data on a web browser. These may contain GUID's and thereby enables tracking of the user. The present disclosure permits detection of these tracking elements.

The present disclosure provides a method performed by a server device. The method disclosed herein is performed for detecting tracking elements of a web page, and optionally for providing information regarding the detected tracking elements to a user. The server device is configured to control a proxy server. Optionally, the server device and the proxy server may form part of the same network architecture. Optionally, the server device comprises the proxy server.

The term "tracking element" refers to an element of a web page, wherein the element is configured to track, monitor, and/or observe one or more activities of a user of the web page. The term "tracking element" can refer to an element of a web page, wherein the element is configured to report to an external device data based on an activity related to the web page. A tracking element is configured to carry out and/or deploy a tracking technique. Tracking technique may comprise one or more of: a cookie containing an unique identifier as value, pixel tracker(s) adapted to send information to a 3rd party server (e.g. allowing to send information without having a 3rd party tracking element detected), an indexed database (e.g. a database format built into a web browser, a local shared object (e.g. a flash local shared object), a ultra sound audio fingerprinting technique (e.g. adapted to recognize the user based on pattern, e.g. by playing a unique ultra sound pattern unhearable by the user, so as to connect the additional personal devices of the user).

The method comprises obtaining a web page address configured to connect to a web server. Obtaining the webpage address may comprise receiving the web page address from a user (e.g. a user wishing to analyse a web page or web site). The web page address may be associated to with a website. A web page may refer to a hypertext document associated with a resource on the World Wide Web, such an web address (e.g. a URL address, and/or an Internet Protocol (IP) address) associated with e.g. a website. The document may be written in HTML (hypertext markup language) and translated (e.g. rendered) by the web browser.

The method comprises establishing a controlled communication interface between the server device and the web server via the proxy server. Controlling the communication interface between the server device and the web server via the proxy server allows to intercept (for further analysis and detection) at the proxy server the communication between the server device and the web server hosting the web page or website associated with the web page.

The method comprises transmitting, via the controlled communication interface, a web page request based on the web page address. The web page request is a network request to e.g. a domain on a web server (e.g. external to the architecture comprising the server device). For example, the server device instructs the web browser (e.g. installed on the server device) to use the proxy server (e.g. a local proxy server), controlled by the server device, for all network requests and/or network calls for controlling communication interface of the server device to external devices, e.g. the web server hosting the web page.

The method comprises receiving, via the controlled communication interface, a web page response, e.g. from the web server. The web page response may comprise a response in HTML, such as an HTML response. For example, when the web browser loads the webpage, the web browser running on the server device submits an initial request to the webserver through the proxy server, controlled by the server device (e.g. to take over control of any activity triggered by possible tracking tag(s) embedded in the loaded web page). For example, when the web server sends the web page response to the web page request, the web page response is intercepted by the proxy server, and accessible to the server device.

The method comprises identifying, based on the web page response, a set of tracking tags including a first tracking tag and a second tracking tag. A tracking tag may be configured to trigger or load content from one or more external webservers, e.g. "script", "iframe" and "image" tags. A tracking tag may pertain to a tag category, e.g. defined in the code used (e.g. defined in the HTLM standard). A tracking tag that is able to load content from an external source, are often used for tracking. For example, before returning the web page response to the web browser from the webserver, the server device identifies a set of tracking tags (e.g. all tracking tags) present in the returned web page response (e.g. the returned HTML response) by e.g. analyzing a code content of the web page response (e.g. the HTML textual content of the response). In one or more example methods, identifying based on the web page response the set of tracking tags comprises analysing a code content of the web page based on the web page response.

The method comprises deactivating all tracking tags of the set. Deactivating all the tracking tags of the set of tag may comprise stopping the loading of external content associated with each of the tracking tags of the set. In one or more example methods, deactivating all the tracking tags of the set comprises assigning a first identifier attribute and a first source attribute to the first tracking tag; and assigning a second identifier attribute and a second source attribute to the second tracking element. A tracking attribute may comprise an identifier attribute, a source attribute (e.g. that defines the location of the source of content, points to source of the data associated with the tag), a code line number attribute (e.g. indicative of a location of the tracking tag in the source code). A source attribute may be called a resource attribute.

In one or more example methods, assigning the first source attribute comprises identifying an original external source attribute associated with the first tracking tag and replacing the original external source attribute with the first source attribute which excludes the original external source.

For example, the identified set of tracking tags are manipulated or deactivated by the server device by applying and/or assigning an identifier attribute (e.g. a unique identifier attribute) to each tracking tag of the set and by renaming for each tracking tag of the set the source attribute pointing to an external source or resource to a dummy source, e.g. "src" to "data-src". This allows preventing the tracking tag from loading external content associated with the external source when it initially is loaded in the web browser. This permits as well to control when the content is loading.

Optionally, identifying, based on the web page response, a set of tracking tags including a first tracking tag and a second tracking tag comprises identifying one or more tracking attributes corresponding to at least one tracking tag of the set. For example, each tracking tag in the source code is registered by one or more corresponding tracking attributes: identifier attribute, source attribute, and code line number attribute to be able to point out the exact location of the tag in the later report. A tracking tag may contain script code that may deploy cookies or trackers. A tracking tag may comprise an image tag which can return only an image as content, but is capable of attaching a cookie to the http response header. For each tracking tag, there may be one or more layers of cookies and additional tracker. Thus it is advantageous to deactivate all tracking tags and enabling the tracking element one by one to be able to identify their tracking attribute(s) and make a list of the tracking technique deployed across the web page. For example, when the manipulated content (including the deactivated tracking tags) has been returned to the web browser through the proxy server, the content is rendered and the server device takes a snapshot of the current state of the web browser, e.g. which tracking elements have been identified (e.g. which cookies have been set) to obtain a list of tracking tags enriched with tracking elements and attributes.

The method comprises activating the first tracking tag. In one or more example methods, activating the first tracking tag comprises re-assigning the first source attribute to the original external source attribute. For example, the server device (e.g. a renderer of the server device) may loop stepwise through the stored list of tracking tags by the identifier attribute that has been applied and/or assigned and activates tracking tags one at a time by renaming the source-attribute back to the original name, e.g. "data-src" is renamed "src" through client-side DOM-manipulation, performed by the server device (e.g. the renderer of the server device using built in client-site scripting like a local JavaScript in the web browser). Activation of a tracking tag makes the corresponding tracking tag load its content from the external 3rd party web server, after which the tracking tag performs any manipulation of the webpage, e.g. any activity, e.g. setting cookies, e.g. triggering additional cookies and/or trackers.

Optionally, the method comprises determining a set of tracking elements deployed by the first tracking tag, and corresponding tracking attributes. For example, determining the set of tracking elements deployed by the first tracking tag and corresponding tracking attributes may comprise determining a first state listing one or more tracking elements prior to activating the first tracking tag, and after activating the first tracking tag (e.g. before activating any other tracking tag of the set), determining a second state listing a set of tracking elements deployed by the first tracking tag, and corresponding tracking attributes.

The disclosed method advantageously allows an end user to detect and to be informed on which tracking elements of a web page (associated to a tracking tag) is deployed, and what monitoring operations or activity, the tracking tag triggers.

In one or more example methods, the method comprises determining a first state listing one or more tracking elements prior to activating the first tracking tag. For example, after a tracking tag has been activated, e.g. the first tracking tag, the server device takes a new snapshot of the state of the web browser to register any differences from the previous state where all tracking tags have been deactivated.

In one or more example methods, the method comprises, after activating the first tracking tag (e.g. before activating any other tracking tag of the set), determining a second state listing a set of tracking elements deployed by the first tracking tag, and corresponding tracking attributes.

A tracking element may correspond to an element deployed by a tracking tag. Examples of tracking elements include a cookie, a pixel tracker, a Local Storage item, a Flash Local Shared Object, an entry in an IndexedDB database or Silverlight Isolated Storage as well as ultrasound automatically playing from an audio- or video-tag. A tracking tag when activated can deploy (e.g. trigger, activate, launch) one or more tracking elements.

A tracking element is characterized by tracking attributes. This way, any new cookie that have been set is identified and characterized by tracking attributes. Also the server device can register which tracking tag is doing what, e.g. which tracking element(s) (e.g. cookies and other tracking technologies) a tracking tag is deploying to the browser. Each tracking element is registered by a number of tracking attributes and the identifier attribute of the firing tracking tag is registered with the tracking element. In other words, the second state lists the state for the whole web page.

In one or more example methods, the method comprises comparing the first state and the second state. In other words, comparing a current state (e.g. the second state) and a previous state (e.g. the first state) of the web page (when activating the first tracking tag), the tracking element (e.g. trackers) deployed by the first tracking tag is identified.

In one or more example methods, the one or more tracking attributes comprise one or more of a name attribute, an identifier attribute, a tracking type attribute, a value attribute, a code line number attribute, an original external source attribute, an expiry date attribute, an attribute indicative of an IP number of a third party domain and a domain attribute. A tracking type attribute may comprise a cookie type attribute or may be indicative of other type of tracking technology.

In one or more example methods, the method comprises determining a first tracking attribute of the first tracking tag based on the comparison. For example, which tracking elements have been deployed and their tracking attribute are detected this way.

In one or more example methods, the method comprises activating the second tracking tag based on the corresponding second identifier attribute after determining the second state. The method may comprise determining a third state listing a set of tracking elements deployed by the second tracking tag and corresponding tracking attributes. The method optionally comprises comparing the second state and the third state.

In one or more example methods, the first identifier attribute comprises a first unique identifier corresponding to the first tracking tag.

In one or more example methods, the second identifier attribute comprises a second unique attribute corresponding to the second tracking tag.

In one or more example methods, the method comprises providing a report comprising one or more tracking attributes of the set of tracking elements. A report may be seen as a data set comprising one or more tracking attributes of the set of tracking elements. In one or more example methods, the method comprises providing a data set comprising one or more tracking attributes of the set of tracking elements. In one or more example methods, the method comprises generating the data set.

Providing the report may comprise transmitting the report to an electronic device, such as a user device, e.g. for privacy compliance, e.g. for obtaining consent, e.g. for deactivation of a part of the tracking tags.

In one or more example methods, the method comprises generating a report comprising one or more tracking attributes of the set of tracking elements. For example, before activating the second tracking tag, the server device generates the report to indicate or to comprise one or more tracking elements associated with the first tracking tag (e.g. cookies and other trackers) and the corresponding tracking attributes. For example, before activating a third tracking tag, the server device updates the report to indicate or comprise one or more tracking elements associated with the second tracking tag and the corresponding tracking attributes.

In one or more embodiments, the set of tracking elements comprises one or more tracking elements associated with the first tracking tag (and optionally the corresponding tracking attributes), and optionally one or more tracking elements associated with the second tracking tag (and optionally the corresponding tracking attributes), and one or more tracking elements associated with a third tracking tag (and optionally the corresponding tracking attributes) etc.

For example, one or more tracking elements associated with the first tracking tag and the corresponding tracking attributes may be seen as one or more first tracking elements and corresponding first tracking attributes.

For example, one or more tracking elements associated with the second tracking tag and the corresponding tracking attributes may be seen as one or more second tracking elements and corresponding second tracking attributes.

For example, one or more tracking elements associated with a third tracking tag and the corresponding tracking attributes may be seen as one or more third tracking elements and corresponding third tracking attributes.

In one or more example methods, the method comprises updating the report to include one or more tracking elements associated with one or more additional tracking tags. In one or more example methods, the method comprises updating the data set to include one or more tracking elements associated with one or more additional tracking tags.

For example, once all tracking tags have been activated, the server device generates a report (e.g. a data set) that indicates, or documents which tracking tags are setting which tracking elements (e.g. cookies and other trackers) and the corresponding tracking attributes.

Further, a server device is provided. The server device comprises a memory module (e.g. memory circuitry), a processor module (e.g. processor circuitry) and an interface module (e.g. interface circuitry). The server device is configured to perform any of the methods disclosed herein.

Further, an electronic device is provided. The electronic device comprises a memory module (e.g. memory circuitry), a processor module (e.g. processor circuitry) and an interface module (e.g. interface circuitry). The electronic device is configured to transmit a web page address to a server device and to receive a report comprising one or more tracking attributes associated with a set of tracking elements of the web page.

The figures are schematic and simplified for clarity, and they merely show details which aid understanding the disclosure, while other details have been left out. Throughout, the same reference numerals are used for identical or corresponding parts.

FIG. 1 is a diagram illustrating an exemplary communication system 1 comprising an exemplary server device 400, an exemplary proxy server 500, an exemplary web server 600 and an exemplary user device 300 according to this disclosure.

As discussed in detail herein, the present disclosure relates to an Internet based communication system 1 comprising wired communication and/or wireless communication.

A server device disclosed herein refers to a device configured to perform the method disclosed herein.

The communication system 1 described herein may comprise one or more user devices 300, 300A, and/or one or more server device 400, and/or one or more web servers 600, and/or one or more proxy servers 500.

A user device may refer to as a computing device configured to be used by a user.

The user device 300, 300A may be configured to communicate with the server device 400 via a link (wired and/or wireless) 10, 10A.

The server device 400 may be configured to communicate with the proxy server 500 via a link (wired and/or wireless) 11.

The server device 400 may be configured to communicate with the web server 600 via proxy server via a link (wired and/or wireless) 11 between the server device 400 and the proxy server 500, and via a link 12 between the proxy server 500 and the web server 600.

Figure 2:
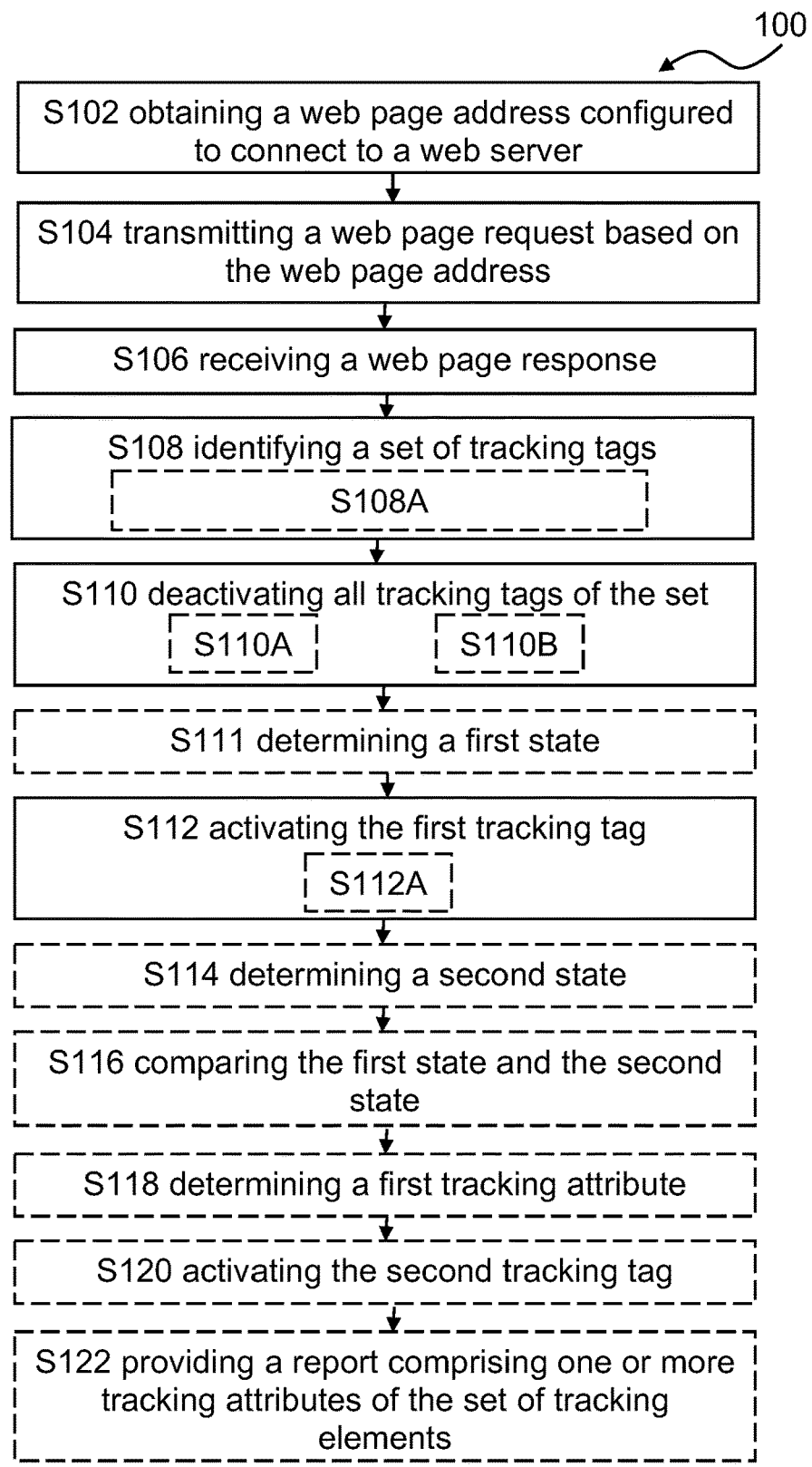
FIG. 2 is a flow-chart illustrating an exemplary method, performed in a wireless device, for a low-latency resumption of a data communication with a network node of a wireless communication system according to this disclosure.

FIG. 2 shows a flow diagram of an exemplary method 100 for detecting tracking elements of a web page according to the disclosure. The method 100 is performed at a server device, for detecting tracking elements of a web page. The server device is configured to control a proxy server.

The method 100 comprises obtaining S102 a web page address configured to connect to a web server.

The method 100 comprises establishing a controlled communication interface between the server device and the web server via the proxy server.

The method 100 comprises transmitting S104 (e.g. to a web server), via the controlled communication interface, a web page request based on the web page address.

The method 100 comprises receiving S106 (e.g. from the web server), via the controlled communication interface, a web page response.

The method 100 comprises identifying S108, based on the web page response, a set of tracking tags including a first tracking tag and a second tracking tag. The method 100 comprises deactivating S110 all tracking tags of the set; and activating S112 the first tracking tag.

In one or more example methods, the method 100 comprises determining S111 a first state listing one or more tracking elements prior to activating the first tracking tag.

In one or more example methods, the method 100 comprises after activating the first tracking tag determining S114 a second state listing a set of tracking elements deployed by the first tracking tag, and corresponding tracking attributes.

In one or more example methods, the method 100 comprises comparing S116 the first state and the second state.

Deactivating S110 all the tracking tags of the set optionally comprises assigning S110A a first identifier attribute and a first source attribute to the first tracking tag; and assigning S110B a second identifier attribute and a second source attribute to the second tracking element.

In one or more example methods, the method 100 comprises determining S118 a first tracking attribute of the first tracking tag based on the comparison.

Identifying S108, based on the web page response, the set of tracking tags may comprise analysing S108A a code content of the web page based on the web page response.

In one or more example methods, the method 100 comprises activating S120 the second tracking tag based on the corresponding second identifier attribute after determining the second state.

The method may comprise determining a third state listing a set of tracking elements deployed by the second tracking tag and corresponding tracking attributes. The method optionally comprises comparing the second state and the third state.

The first identifier attribute optionally comprises a first unique identifier corresponding to the first tracking tag, and the second identifier attribute comprises a second unique attribute corresponding to the second tracking tag.

Assigning S110A the first source attribute may comprise identifying an original external source attribute associated with the first tracking tag and replacing the original external source attribute with the first source attribute which excludes the original external source.

Activating S112 the first tracking tag may comprise re-assigning S112A the first source attribute to the original external source attribute.

In one or more example methods, the method 100 comprises providing S122 a report comprising one or more tracking attributes of the set of tracking elements. The report may be seen as a data set comprising the one or more tracking attributes corresponding to the one or more tracking elements of the set of tracking elements. In one or more example methods, the method 100 comprises providing a data set comprising one or more tracking attributes of the set of tracking elements. In one or more example methods, the method 100 comprises generating the data set comprising one or more tracking attributes of the set of tracking elements.

Providing S122 the report may comprise transmitting the report to an electronic device, such as a user device, e.g. for privacy compliance, e.g. for obtaining consent, e.g. for deactivation of a part of the tracking tags.

In one or more example methods, the method 100 comprises generating a report comprising one or more tracking attributes of the set of tracking elements. For example, before activating the second tracking tag, the server device generates the report to indicate or to comprise one or more tracking elements associated with the first tracking tag (e.g. cookies and other trackers) and the corresponding tracking attributes. For example, before activating a third tracking tag, the server device updates the report to indicate or comprise one or more tracking elements associated with the second tracking tag and the corresponding tracking attributes.

In one or more embodiments, the set of tracking elements comprises one or more tracking elements associated with the first tracking tag (and optionally the corresponding tracking attributes), and optionally one or more tracking elements associated with the second tracking tag (and optionally the corresponding tracking attributes), and one or more tracking elements associated with a third tracking tag (and optionally the corresponding tracking attributes) etc.

For example, one or more tracking elements associated with the first tracking tag and the corresponding tracking attributes may be seen as one or more first tracking elements and corresponding first tracking attributes.

For example, one or more tracking elements associated with the second tracking tag and the corresponding tracking attributes may be seen as one or more second tracking elements and corresponding second tracking attributes.

For example, one or more tracking elements associated with a third tracking tag and the corresponding tracking attributes may be seen as one or more third tracking elements and corresponding third tracking attributes.

In one or more example methods, the method 100 comprises updating the report to include one or more tracking elements associated with one or more additional tracking tags.

For example, once all tracking tags have been activated, the server device generates a report that indicates, or documents which tracking tags are setting which tracking elements (e.g. cookies and other trackers) and the corresponding tracking attributes.

The one or more tracking attributes optionally comprise one or more of: a name attribute, an identifier attribute, a tracking type attribute, a value attribute, a code line number attribute, an original external source attribute, an expiry date attribute, an attribute indicative of an IP number of a third party domain and a domain attribute.

Further, a computer readable storage medium storing one or more programs is provided. The one or more programs comprise instructions, which when executed by an electronic device cause the electronic device to perform any of the methods disclosed herein.

Further, an electronic device is provided. The electronic device comprises a memory module, a processor module and an interface module. The electronic device is configured to transmit a web page address to a server device and to receive a report comprising one or more tracking attributes associated with a set of tracking elements of the web page.

Figure 3:
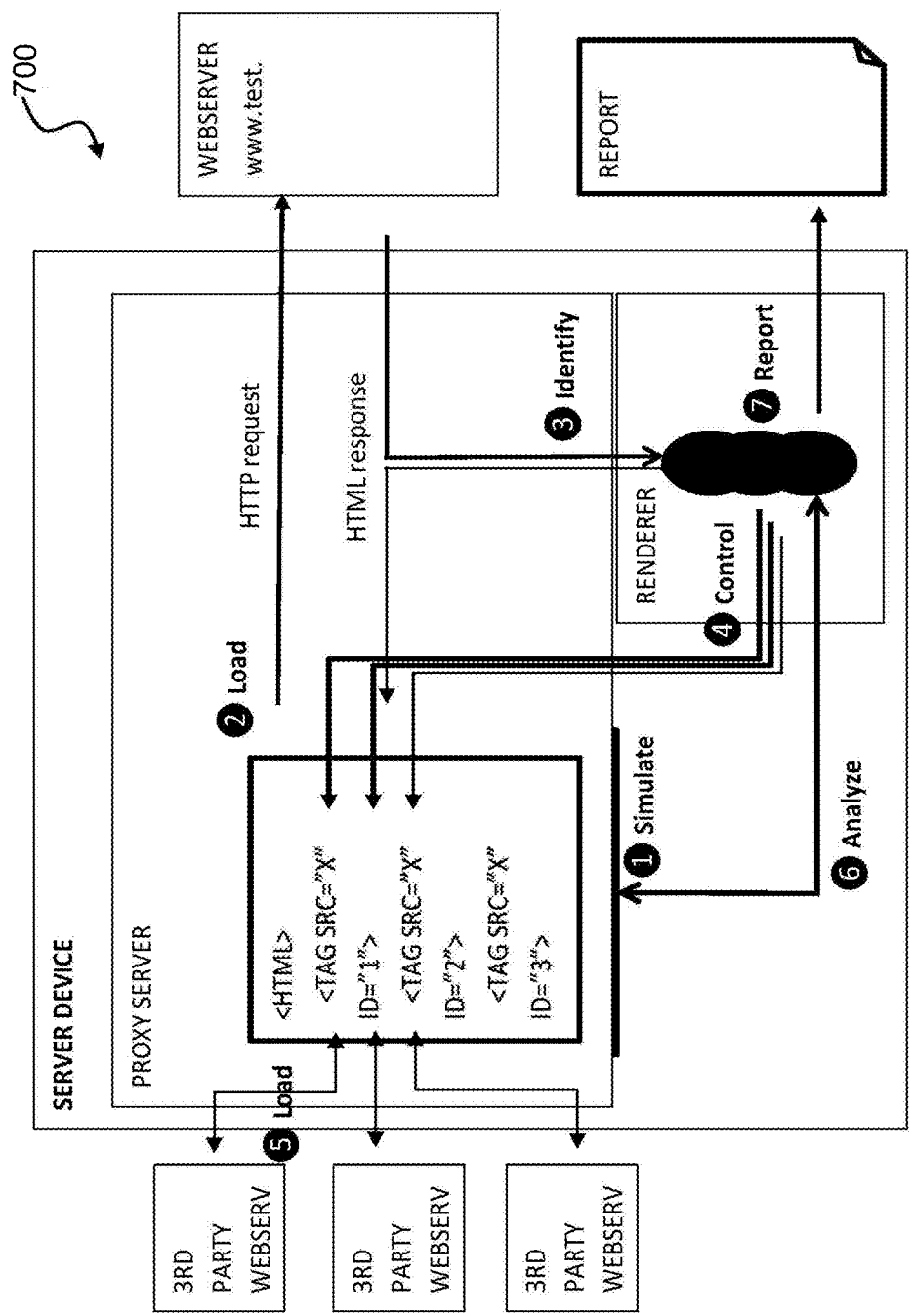
FIG. 3 is a diagram illustrating an example process according to the present disclosure.

FIG. 3 is a diagram 500 illustrating an example process according to the present disclosure. The diagram 500 illustrates an example where the disclosed technique is applied. For example, the server device instructs the web browser (e.g. installed on the server device) to use the proxy server (e.g. a local proxy server), controlled by the server device, for all network requests and/or network calls for controlling communication interface of the server device to external devices, e.g. the web server hosting the web page. For example, when the web browser loads the webpage, the web browser running on the server device submits an initial request to the webserver through the proxy server, controlled by the server device (e.g. to take over control of any activity triggered by possible tracking tag(s) embedded in the loaded web page). For example, when the web server sends the web page response to the web page request, the web page response is intercepted by the proxy server, and accessible to the server device. For example, before returning the web page response to the web browser from the webserver, the server device identifies a set of tracking tags (e.g. all tracking tags) present in the returned web page response (e.g. the returned HTML response) by e.g. analyzing a code content of the web page response (e.g. the HTML textual content of the response). For example, the identified set of tracking tags are manipulated or deactivated by the server device by applying and/or assigning an identifier attribute (e.g. a unique identifier attribute) to each tracking tag of the set and by renaming for each tracking tag of the set the source attribute pointing to an external source or resource to a dummy source, e.g. "src" to "data-src". This allows preventing the tracking tag from loading external content associated with the external source when it initially is loaded in the web browser. This permits as well to control when the content is loading.

For example, each tracking tag in the source code is registered by one or more corresponding tracking attributes: identifier attribute, source attribute, and code line number attribute to be able to point out the exact location of the tag in the later report. A tracking tag contains script code that may deploy cookies or trackers. For each tracking tag, there may be one or more layers of cookies and one or more additional trackers. Thus, it is advantageous to deactivate all tracking tags and enabling the tracking element one by one to be able to identify their tracking attribute(s) and make a list of the tracking technique deployed across the web page. For example, when the manipulated content (including the deactivated tracking tags) has been returned to the web browser through the proxy server, the content is rendered and the server device takes a snapshot of the current state of the web browser, e.g. which tracking tags have been identified (e.g. which cookies have been set) to obtain a list of tracking tags enriched with tracking attributes.

For example, the server device (e.g. a renderer of the server device) may loop stepwise through the stored list of tracking tags by the identifier attribute that has been applied and/or assigned and activates tracking tags one at a time by renaming the source-attribute back to the original name, e.g. "data-src" is renamed "src" through client-side DOM-manipulation, performed by the server device (e.g. the renderer of the server device using built in JavaScript in the web browser). Activation of a tracking tag makes the corresponding tracking tag load its content from the external 3rd party web server, after which the tracking tag performs any manipulation of the webpage, e.g. any activity, e.g. setting cookies, e.g. triggering additional cookies and/or trackers.

For example, after a tracking tag has been activated, e.g. the first tracking tag, the server device takes a new snapshot of the state of the web browser to register any differences from the previous state where all tracking tags have been deactivated.

For example, any new cookie that have been set is identified and characterized by tracking attributes. Also the server device can register which tracking tag is doing what, e.g. which tracking element (e.g. cookies and other tracking technologies) which a tacking tag is deploying to the browser. Each tracking element is registered by a number of tracking attributes and the identifier attribute of the firing tracking tag is registered with the tracking element. In other words, the second state lists the state for the whole web page.

For example, once all tracking tags have been activated, the server device generates a report that documents which tracking tags are setting which tracking element (e.g. cookies and other trackers) and the corresponding tracking attributes.

Figure 4:
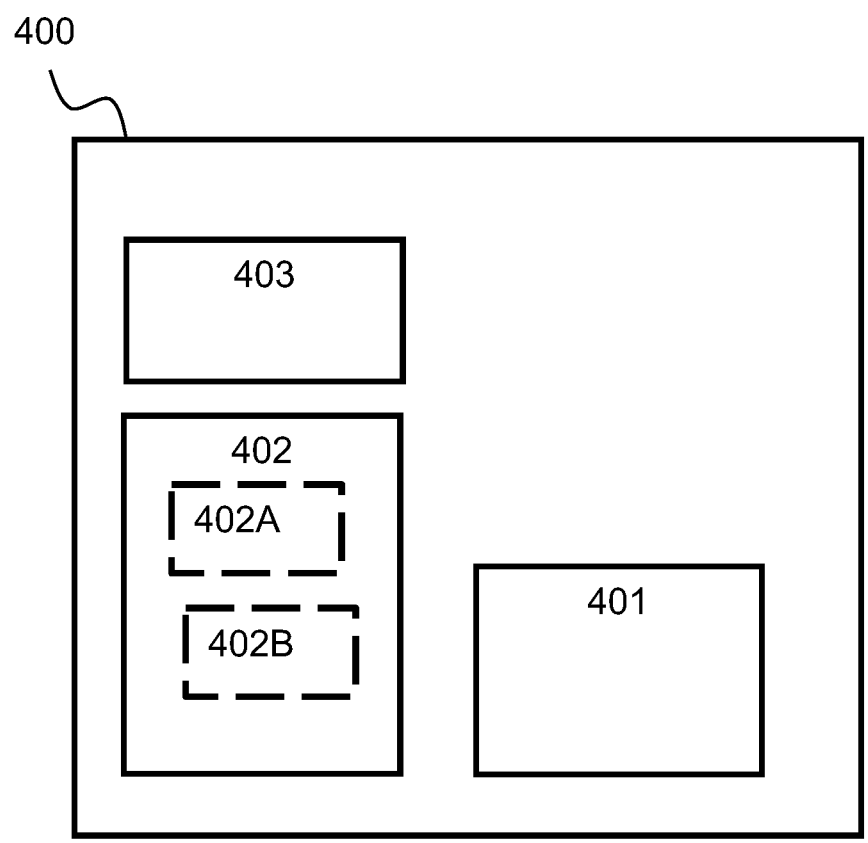
FIG. 4 is a block diagram illustrating an exemplary server device according to this disclosure.

FIG. 4 shows a block diagram of an exemplary server device 400 according to the disclosure. The server device 400 comprises a memory circuitry 401, a processor circuitry 402 and an interface circuitry 403. The server device 400 is configured to perform any of the methods disclosed in FIG. 2.

The server device 400 is configured to communicate with a web server via a proxy server. The server device 400 is configured to control a proxy server (e.g. proxy server of FIG. 1, 3). The processor circuitry 402 may be configured to run a web browser 402A and/or a renderer 402B.

The server device 400 is configured to:
obtain a web page address configured to connect to a web server;
establish a controlled communication interface between the server device and the web server via the proxy server;
transmit, via the controlled communication interface, a web page request based on the web page address;
receive, via the controlled communication interface, a web page response;

identify, based on the web page response, a set of tracking tags including a first tracking tag and a second tracking tag;

deactivate all tracking tags of the set; and activate the first tracking tag.

The processor circuitry 402 is optionally configured to perform any of the operations disclosed in FIG. 2 (e.g. S108A, S11A, S110B, S111, S112A, S114, S116, S118, S120, S122). The operations of the server device 400 may be embodied in the form of executable logic routines (e.g., lines of code, software programs, etc.) that are stored on a non-transitory computer readable medium (e.g., the memory circuitry 401) and are executed by the processor circuitry 402).

Furthermore, the operations of the server device 400 may be considered a method that the server device 400 is configured to carry out. Also, while the described functions and operations may be implemented in software, such functionality may as well be carried out via dedicated hardware or firmware, or some combination of hardware, firmware and/or software.

The memory circuitry 401 may be one or more of a buffer, a flash memory, a hard drive, a removable media, a volatile memory, a non-volatile memory, a random access memory (RAM), or other suitable device. In a typical arrangement, the memory circuitry 401 may include a non-volatile memory for long term data storage and a volatile memory that functions as system memory for the processor circuitry 402. The memory circuitry 401 may exchange data with the processor circuitry 402 over a data bus. Control lines and an address bus between the memory circuitry 401 and the processor circuitry 402 also may be present (not shown in FIG. 4). The memory circuitry 401 is considered a non-transitory computer readable medium.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-4 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

The invention claimed is:

1. A method, performed at a server device, for detecting tracking elements of a web page, wherein the server device is configured to control a proxy server, the method comprising:

obtaining a web page address configured to connect to a web server;

establishing a controlled communication interface between the server device and the web server via the proxy server;

transmitting, via the controlled communication interface, a web page request based on the web page address;

receiving, via the controlled communication interface, a web page response;

identifying, based on the web page response, a set of tracking tags including a first tracking tag and a second tracking tag;

deactivating all tracking tags of the set; and activating the first tracking tag; and updating a set of tracking attributes of the first tracking tag.

2. The method according to claim 1, the method comprising determining a first state listing one or more tracking elements prior to activating the first tracking tag.

3. The method according to claim 2, the method comprising after activating the first tracking tag:

determining a second state listing a set of tracking elements deployed by the first tracking tag, and corresponding tracking attributes.

4. The method according to claim 3, the method comprising comparing the first state and the second state.

5. The method according to claim 1, wherein deactivating all the tracking tags of the set comprises:
assigning a first identifier attribute and a first source attribute to the first tracking tag; and
assigning a second identifier attribute and a second source attribute to the second tracking element.

6. The method according to claim 4, the method comprising determining a first tracking attribute of the first tracking tag based on the comparison.

7. The method according to claim 1, wherein identifying, based on the web page response, the set of tracking tags comprise analysing a code content of the web page based on the web page response.

8. The method according to claim 5, the method comprising:
activating the second tracking tag based on the corresponding second identifier attribute after determining the second state.

9. The method according to claim 5, wherein the first identifier attribute comprises a first unique identifier corresponding to the first tracking tag, and the second identifier attribute comprises a second unique attribute corresponding to the second tracking tag.

10. The method according to claim 5, wherein assigning the first source attribute comprises identifying an original external source attribute associated with the first tracking tag and replacing the original external source attribute with the first source attribute which excludes the original external source.

11. The method according to claim 5, wherein activating the first tracking tag comprises re-assigning the first source attribute to the original external source attribute.

12. A server device comprising a memory circuitry, a processor circuitry, an interface circuitry, wherein the server device is configured to perform any of the methods according to claim 1.

13. A computer readable storage medium storing one or more programs, the one or more programs comprising instructions, which when executed by an electronic device cause the electronic device to perform the method according to claim 1.

14. The method according to claim 1, the method comprising, providing a report comprising one or more tracking attributes of a set of tracking elements, the set of tracking elements comprising tracking elements deployed by the first tracking tag.

15. The method according to claim 14, the method comprising updating the report to include one or more tracking elements associated with one or more additional tracking tags.

16. The method according to claim 14, wherein the one or more tracking attributes comprise one or more of: a name attribute, an identifier attribute, a tracking type attribute, a value attribute, a code line number attribute, an original external source attribute, an expiry date attribute, an attribute indicative of an IP number of a third party domain, and a domain attribute.

* * * * *